Figure 1:
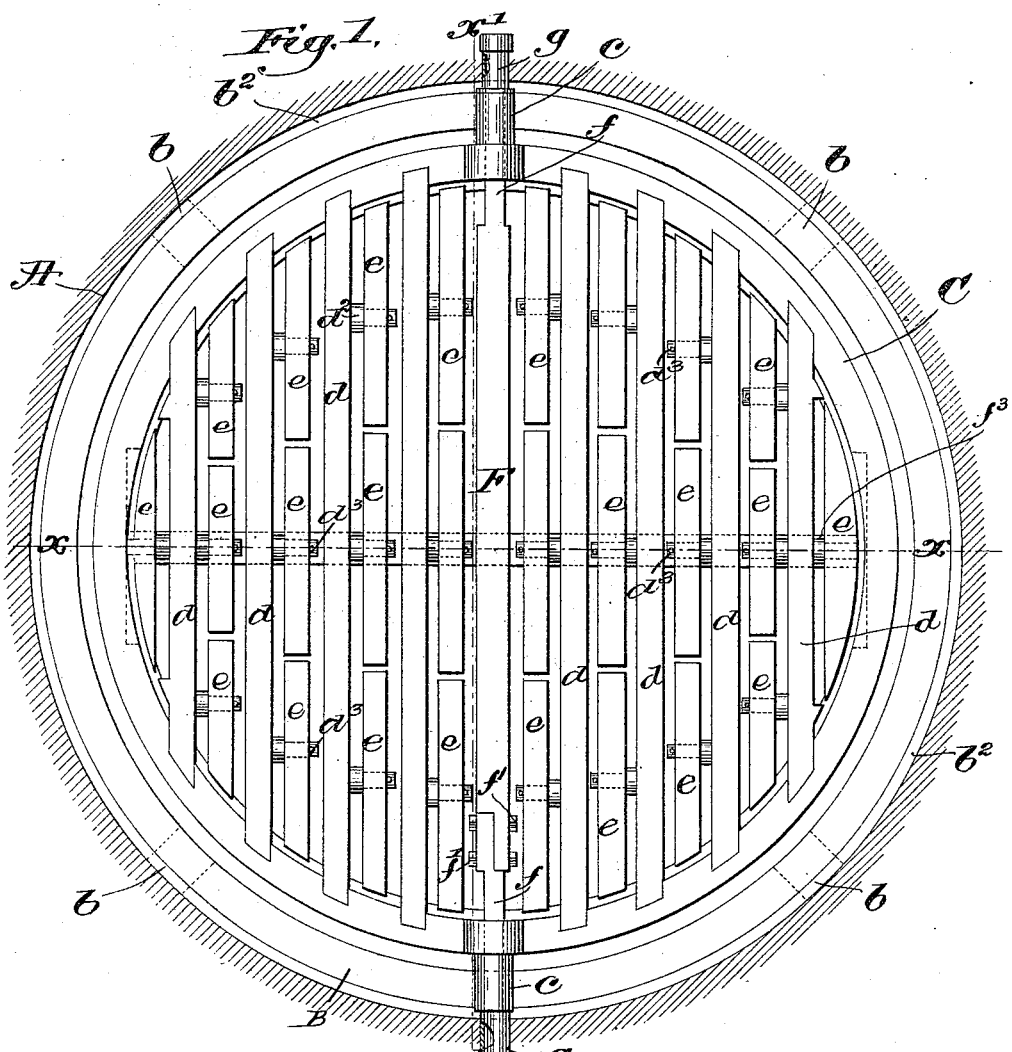

(No Model.)   3 Sheets—Sheet 1.

E. FALES.
COMBINED DUMPING AND SHAKING GRATE.

No. 526,074. Patented Sept. 18, 1894.

Witnesses.
Edward F. Allen.
Thomas J. Drummond.

Inventor:
Edward Fales.
by Crosby & Gregory Attys.

(No Model.) 3 Sheets—Sheet 2.
E. FALES.
COMBINED DUMPING AND SHAKING GRATE.

No. 526,074. Patented Sept. 18, 1894.

Witnesses:
Edward F. Allen.
Thomas J. Drummond.

Inventor:
Edward Fales.
By Crosby Gregory
attys.

(No Model.) 3 Sheets—Sheet 3.
E. FALES.
COMBINED DUMPING AND SHAKING GRATE.

No. 526,074. Patented Sept. 18, 1894.

Witnesses.
Edward F. Allen
Thomas J. Drummond

Inventor:
Edward Fales
by Crosby & Gregory
attys.

UNITED STATES PATENT OFFICE.

EDWARD FALES, OF WINTHROP, MASSACHUSETTS.

COMBINED DUMPING AND SHAKING GRATE.

SPECIFICATION forming part of Letters Patent No. 526,074, dated September 18, 1894.

Application filed April 18, 1894. Serial No. 507,999. (No model.)

*To all whom it may concern:*

Be it known that I, EDWARD FALES, of Winthrop, county of Suffolk, State of Massachusetts, have invented an Improvement in Combined Dumping and Shaking Grates, of which the following description, in connection with the accompanying drawings, is a specification, like letters on the drawings representing like parts.

In another application, Serial No. 500,264, filed February 15, 1894, I have shown a combined dumping and shaking grate consisting of a series of alternately arranged fixed and movable grate bars or sections, all mounted in a frame, which latter is pivoted or hung on trunnions resting in bearings in a surrounding box or wall.

The grate is rotated about its axis for dumping purposes by means of a suitable lever or handle attached to one of the trunnions extended through to the outside of the furnace for that purpose, a separate or independent lever or handle being employed to agitate the movable grate sections for the purpose of shaking a fire, suitable connections being provided to automatically connect and disconnect the said shaking lever or handle with its grate sections when the frame is rotated to dump a fire.

The principal object of this my present invention is to dispense with one of the two levers shown in my said application, and to so construct a grate of the class therein shown that it may be shaken and dumped by or through a single lever or handle to thereby simplify and cheapen the construction.

In accordance with this my present invention, the fixed and movable grate bars or sections are carried by a frame made to rock on trunnions resting in a suitable box, said movable sections being connected with and rocked or agitated for shaking by an axial arm projecting through to the outside of the furnace, said arm, which may be one of the trunnions, also furnishing means by which the grate is rocked on its trunnions for the purpose of dumping.

In the preferred construction the axial projecting arm referred to is made to slide in the line of its axis for the purpose of agitating or shaking the movable sections and to rock about its axis when the grate is to be dumped. The above, together with other features of my invention, will be fully hereinafter described and set forth in the claims.

Figure 2:
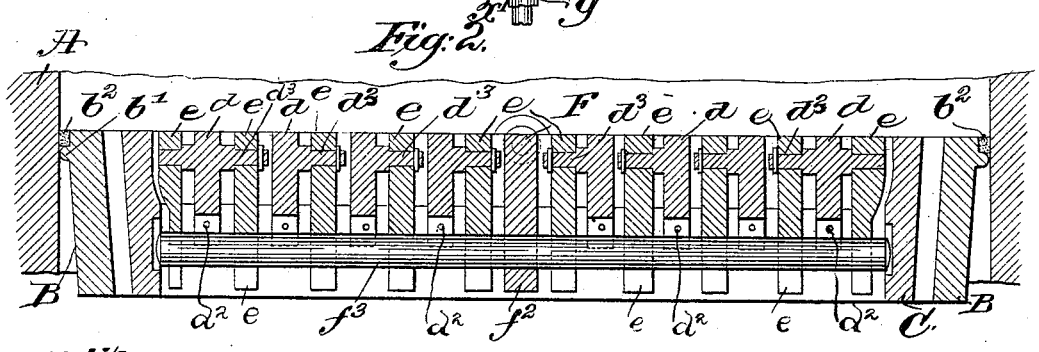
Figure 3:
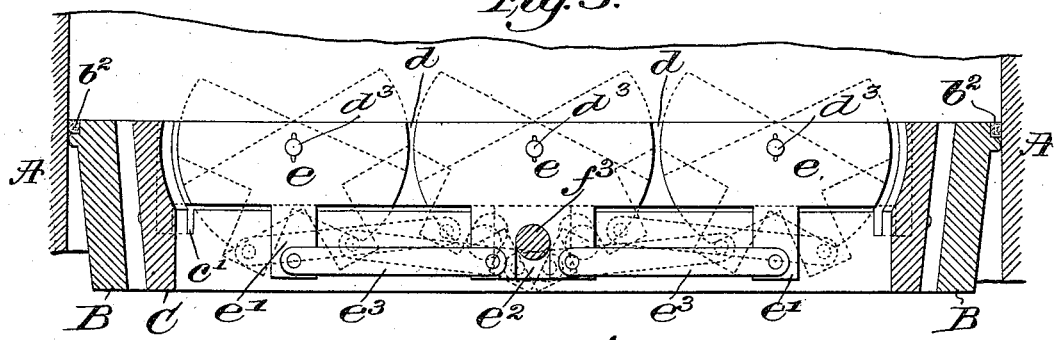
Figure 4:
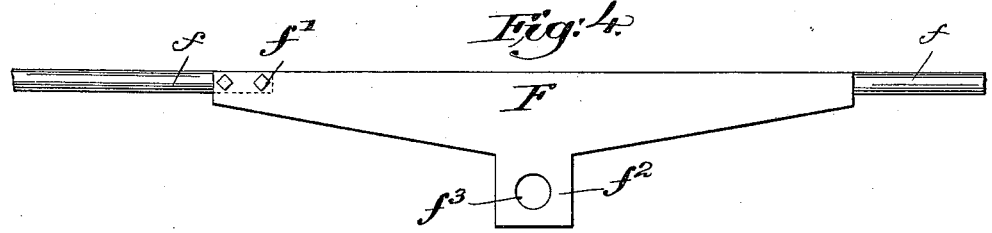
Figures 5, 7:
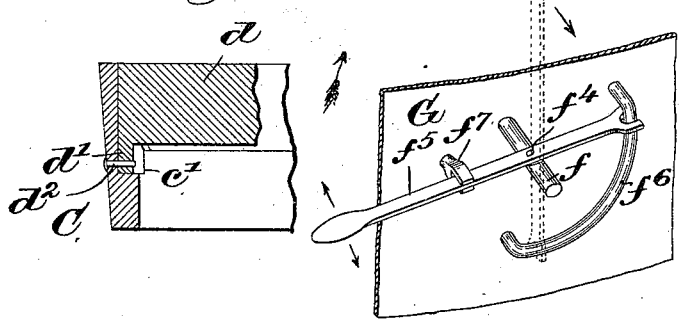
Figure 6:
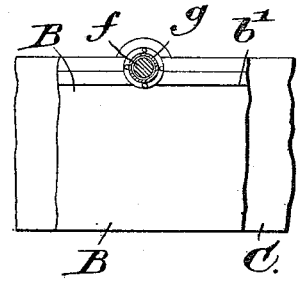
Figure 8:
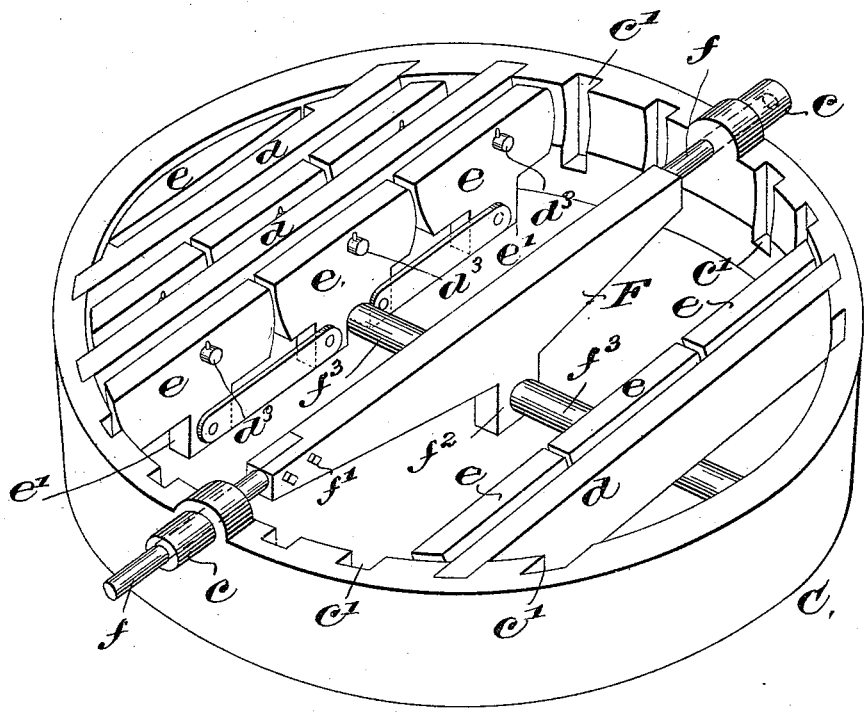

In the drawings, Figure 1 illustrates in plan view one form or embodiment of my invention. Fig. 2 is a cross section on the dotted line $x$—$x$, Fig. 1; Fig. 3, a vertical or longitudinal section on the dotted line $x'$—$x'$, Fig. 1; Fig. 4, a side view of the axial arm detached; Fig. 5, a sectional detail showing the supporting end of one of the fixed grate bars resting in its socket in the pivoted frame; Fig. 6, a detail of a portion of the outside of the pivoted frame showing one of the trunnions through which the dumping and shaking arm in the present embodiment of my invention protrudes; Fig. 7, a perspective detail showing the preferred arrangement of lever for shaking and dumping the grate, and Fig. 8, a perspective view to be referred to.

Referring to the drawings, in the particular construction selected to illustrate my invention, A is a suitable box or wall shown as circular in form and it may be a part of the combustion chamber of the furnace, or an independent box dropped into said combustion chamber, in which latter case it is supported in usual manner and need not, therefore, be herein described in detail. Within this box A I have arranged a fixed ring or frame B, herein shown as supported upon inwardly projecting ears or lugs $b$, the said ring B having at diametrically opposite points preferably at the front and back of the furnace suitable bearings for the reception of the trunnions $c$, $c$, on the rocking ring or frame C.

The rocking frame C is provided at its inner face with suitably spaced pockets $c'$, in which rest the ends of the fixed grate bars $d$, shown as, and preferably, extending in lines substantially parallel with the axis of the frame C, and preferably provided at their opposite ends with depending supports $d'$, $d'$, which rest upon the bottoms of the pockets, as shown in Fig. 5. Pins or other suitable fastening devices may be inserted through these depending supports $d'$, and the wall of the movable frame adjacent thereto, as shown at $d^2$, to retain the fixed bars in position in their respective pockets during transportation or when setting up or dumping the grate.

In the present embodiment of my invention each of the fixed grate bars $d$ is provided at one side with a plurality of pivot projections $d^3$, upon which are mounted the movable grate sections $e$, $e$, see Figs. 1 to 3, split pins being passed through the outer ends of the pivots to retain the movable sections in position, or the said pivots may be headed or threaded to receive nuts or otherwise constructed to retain the movable sections in proper working position thereupon.

Referring to Fig. 3, each of the movable sections $e$ is preferably provided with a depending tail portion $e'$, the tail of the middle section for each series being shown as wider than the others and provided with a vertical central slot $e^2$, as shown.

The movable sections of each series, herein shown as three in number, that is, of the movable sections attached to a single fixed grate bar are shown connected by suitable links $e^3$, so that movement of any one of the sections causes like movement of the others.

Referring to Fig. 1, F is an axial arm rounded at $f$ at its opposite ends, which latter are passed through the trunnions $c$ of the movable frame C, which trunnions are made hollow for this purpose, the said arm F having both a sliding and a rocking or rotative movement in the said hollow trunnions.

In the present embodiment of my invention, the rounded end $f$ of the arm F which is at the front of the furnace is made as a separate piece from the main portion of the arm, and bolted thereto in suitable manner, as by bolts $f'$ to facilitate setting up the grate, although the said end may be integral with the main portion of the arm, or both rounded ends may be made separate and secured to the body of the arm if desired.

The axial arm F, shown separately in Fig. 4, has a depending tail-piece $f^2$, which supports the long actuating rod $f^3$, which extends at right angles to the axis of the movable frame C and passes through the vertical slots $e^2$ in the depending tails of all the central movable sections of the grate, as best shown in Figs. 2 and 3, so that when the axial arm F is slid longitudinally in the hollow trunnions, the actuating rod $f^3$ will cause all the movable sections of the grate to be rocked in unison from one to another of their dotted positions Fig. 3. On the other hand, if the axial arm F be rotated in either direction, the end of the rod $f^3$ which is raised, acts through the several movable sections and the fixed grate bars to turn the entire frame C upon its trunnions for dumping purposes, so that a single arm, as the one F herein shown, suffices both for shaking and dumping.

Referring, now, to Fig. 7, G is a portion of the front or face plate of the furnace, the end $f$ of the axial arm F being shown projecting through to the exterior of the furnace where it has pivoted to it at $f^4$ an operating handle or lever $f^5$, forked at its end opposite the handle to straddle the curved fulcrum rod $f^6$ secured to the front plate G.

The handle or operating lever $f^5$ may be turned into its dotted position, as shown, to rock the axial arm F and dump the grate, the forked end of the said lever sliding down on the curved fulcrum rod $f^6$, yet whatever be the rotative position of the arm F, the fulcrum rod $f^6$ serves as a fulcrum upon which the lever $f^5$ may be moved to impart a sliding reciprocation to the axial arm to shake the grate.

I prefer to employ some means, such for instance as the fork $f^7$, to lock the operating handle or lever $f^5$ in normal horizontal position, in which position it will remain while the grate is in use, it being withdrawn from the said locking device $f^7$ and raised or depressed slightly to clear the locking device when it becomes necessary to shake or dump the fire.

To prevent dust from the ash pit or combustion chamber escaping around the trunnions and bearings into the air chamber, I have inclosed the projecting ends of the axial arm F in suitable casings $g$ in a well known manner.

The fixed ring B, as herein shown, is provided with a surrounding lip $b'$, upon which is placed a suitable packing substance $b^2$ to render the joint essentially tight.

It will be noticed in my improved grate that each of the fixed grate bars $d$ with its attached movable sections $e$, may be removed from the rocking frame C independently of all the others.

The peripheries of the movable and fixed rings or frames B and C are preferably made tapering, as shown, in order that the parts may be more closely fitted to each other and yet work properly, and it will be noticed that the adjacent ends of the movable sections $e$, together with the adjacent portions of the surrounding frame C are also properly curved, in order that a uniform space may be preserved between the same during the shaking of the grate.

The construction or embodiment of my invention herein shown is particularly adapted for use in connection with hot air furnaces used for house heating purposes, but I desire it to be understood that this invention is not limited to any particular use, nor is it restricted to the particular construction shown, or any particular construction, for it is evident the same may be varied in many ways without departing from the spirit and scope of the invention as claimed.

I claim—

1. A combined dumping and shaking grate, comprising a box, a rocking frame mounted therein, a series of fixed grate bars carried by said frame, movable grate sections arranged between the several fixed grate bars, and a sliding rod substantially parallel with the said fixed bars and adapted when rotated to also rotate or rock the said rocking frame for dumping purposes, lateral connections extending from the said sliding rod to and to agitate the said movable sections when the said bar is reciprocated, substantially as described.

2. In a combined dumping and shaking grate, a box, a rocking frame mounted therein, a series of independent grate sections pivoted to rock in said frame about axes at right angles to the axis of said frame and arranged in cross series, that is, in series substantially parallel with their respective axes, a sliding arm substantially parallel with the axis of said frame, and lateral connections between the said arm and said sections and the said rocking frame, whereby sliding of said arm rocks said sections, and rotation of said arm rotates the entire frame for dumping, substantially as described.

3. In a combined dumping and shaking grate, a box, a rocking frame mounted therein, a series of fixed grate bars carried by said rocking frame and substantially parallel with the axis thereof, one or more movable grate sections pivoted to each of said fixed grate bars, a sliding arm arranged parallel with the axis of said rocking frame, and lateral connections between it and one of the said rocking sections attached to each fixed bar, and connections between the rocking sections of each fixed bar whereby sliding movement of the said axial arm causes a rocking movement of all of the movable sections, substantially as described.

4. In a combined dumping and shaking grate, a box, a rocking frame having hollow trunnions mounted therein, a series of fixed grate bars carried by said rocking frame and arranged substantially parallel with the axis thereof, one or more movable grate sections pivoted to each grate bar and connected to rock in unison, an axial arm mounted to slide in the said hollow trunnions and connected with the said movable sections, whereby sliding movement of the said arm causes rocking movement of the said sections, rotation of the said arm causing rotation of the said rocking frame, substantially as described.

5. In a combined dumping and shaking grate, a box, a rocking frame having trunnions journaled therein, a series of fixed grate bars carried by said rocking frame, one or more movable sections pivoted to each of said fixed bars and mounted to rock in unison, one of the rocking sections on each fixed bar having a depending tail provided with a vertical slot as $e^2$, an axial arm mounted to slide in the trunnions of said movable frame and provided with a laterally extended actuating rod entering the slot $e^2$ of the said sections, whereby sliding movement of said axial arm causes rocking of the said sections, and rotation of the said arm causes rotation of the said frame, substantially as described.

6. In a combined dumping and shaking grate, a rocking frame, and movable grate sections carried thereby, an axial arm adapted to be rocked to dump the grate and reciprocated to rock the grate sections, combined with an operating lever connected with the extended end of the said axial arm, and having its fulcrum end adapted to move on an arc-shaped fulcrum to operate whereby the grate may be shaken while in an angular position, substantially as described.

7. In a combined dumping and shaking grate, a box having tapering inner walls; a rocking frame pivotally mounted in said box and at its under side made conical or tapering to substantially conform to the inner walls of said box; pivot trunnions for and at the top of said rocking frame, whereby the surface of said frame is normally at or near a line passing through the axis of said frame; fixed and movable grate bars or sections the latter arranged between the fixed bars and substantially parallel with the axis of said frame, a sliding rod parallel with the axis of said frame, and lateral connections between it and the said movable sections, whereby sliding of the bar agitates the sections for shaking, and rotation of the bar rotates the frame for dumping, the latter movement, owing to the tapering sides of the frame and box, taking place without substantially varying the separation between the said frame and box, substantially as described.

In testimony whereof I have signed my name to this specification in the presence of two subscribing witnesses.

EDWARD FALES.

Witnesses:
FREDERICK L. EMERY,
AUGUSTA E. DEAN.